US009188070B2

(12) United States Patent
Asakura et al.

(10) Patent No.: US 9,188,070 B2
(45) Date of Patent: Nov. 17, 2015

(54) VEHICLE STOP CONTROL SYSTEM

(71) Applicant: HONDA MOTOR CO., LTD., Tokyo (JP)

(72) Inventors: Masahiko Asakura, Wako (JP); Hiroshi Yoneguchi, Wako (JP); Ryuji Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 14/170,763

(22) Filed: Feb. 3, 2014

(65) Prior Publication Data
US 2014/0244139 A1    Aug. 28, 2014

(30) Foreign Application Priority Data

Feb. 28, 2013    (JP) .................................. 2013-039304

(51) Int. Cl.
*G06F 19/00*    (2011.01)
*F02D 29/02*    (2006.01)
(Continued)

(52) U.S. Cl.
CPC ............... *F02D 29/02* (2013.01); *F02D 17/04* (2013.01); *F02N 11/0837* (2013.01); *F02N 2200/0801* (2013.01); *F02N 2200/125* (2013.01)

(58) Field of Classification Search
CPC ...... F02D 41/042; F02D 41/06; F02D 41/062
USPC .................... 701/112, 113; 123/179.1, 179.4, 123/179.14; 180/65.21
See application file for complete search history.

(56) References Cited

U.S. PATENT DOCUMENTS

| 6,953,021 | B2 * | 10/2005 | Wakashiro et al. ...... B60K 6/48 |
| | | | 123/198 F |
| 9,080,534 | B2 * | 7/2015 | Matsunaga ......... F02N 11/0822 |
| 2010/0229815 | A1 * | 9/2010 | Senda et al. ........ F02N 11/0833 |
| | | | 123/179.4 |

(Continued)

FOREIGN PATENT DOCUMENTS

| DE | 2803145 A1 | 7/1979 |
| DE | 101 29 877 A1 | 3/2003 |

(Continued)

OTHER PUBLICATIONS

Japanese Office Action application No. 2013-039304 dated Sep. 2, 2014.

(Continued)

*Primary Examiner* — John Kwon
(74) *Attorney, Agent, or Firm* — Squire Patton Boggs (US) LLP

(57) ABSTRACT

A vehicle stop control system capable of finely and properly determining traveling of a vehicle in a traffic jam to permit or inhibit automatic stop according to the determination result to ensure the effect of fuel economy improvement by automatic stop and avoiding inconveniences caused by frequent execution of automatic stop and restart. The system sets a precondition vehicle speed satisfaction flag to 1 when a vehicle speed becomes not lower than a precondition speed after an internal combustion engine was automatically stopped to permit automatic stop. Further, time after the vehicle speed passed a jam determination speed and until the vehicle speed passes the same again is acquired as passing time. When the passing time is shorter than a predetermined time period, the system determines that the vehicle is traveling in a jam, and resets the flag to 0 to inhibit automatic stop.

7 Claims, 6 Drawing Sheets

(51) Int. Cl.
*F02D 17/04* (2006.01)
*F02N 11/08* (2006.01)

(56) References Cited

U.S. PATENT DOCUMENTS

2013/0110382 A1* 5/2013 Ishikawa et al. .... F02N 11/0848
 701/112
2014/0316628 A1* 10/2014 Miyashita ........... B60R 16/0236
 701/22
2015/0011360 A1* 1/2015 Sano ....................... F02D 29/02
 477/203

FOREIGN PATENT DOCUMENTS

| DE | 10 2004 046 445 A1 | 4/2005 |
| DE | 10 2008 064 018 A1 | 7/2010 |
| DE | 10 2011 107 005 A1 | 1/2013 |
| JP | 02-138557 A | 5/1990 |
| JP | 2010-209864 A | 9/2010 |
| JP | 2011-202638 A | 10/2011 |

OTHER PUBLICATIONS

German Search Report application No. 10 2014 203 460.4 issued Oct. 29, 2014.

* cited by examiner

VEHICLE STOP CONTROL SYSTEM

BACKGROUND OF THE INVENTION

1. Field of the Invention

The present invention relates to a vehicle stop control system that automatically stops an internal combustion engine when predetermined stop conditions are satisfied, and then automatically restarts the engine when predetermined restart conditions are satisfied.

2. Description of the Related Art

A conventional vehicle stop control system of this type is disclosed in Japanese Laid-Open Patent Publication (Kokai) No. 2011-202638. This stop control system executes idling stop during traveling in which an internal combustion engine is stopped without waiting for a vehicle to stop during decelerating traveling of the vehicle when predetermined stop conditions are satisfied. Further, it is determined whether or not a state in which a vehicle speed is not lower than a predetermined speed (e.g. 40 km/h) continues for a predetermined time period (e.g. 10 seconds) or longer. If it is determined that the above-mentioned condition concerning the vehicle speed is not satisfied, it is judged that the vehicle is traveling on e.g. a back street or a country road, on which the vehicle has to repeatedly perform a temporary stop, or the vehicle is traveling in a traffic jam, so that idling stop is inhibited. This prevents troublesomeness and discomfort from being caused by frequent execution of idling stop and restart.

In the above-described conventional vehicle stop control system, as a condition for executing idling stop, there is roughly defined a condition that the state in which the vehicle speed is not lower than the predetermined speed continues for the predetermined time period or longer, and unless this condition is satisfied, idling stop is inhibited. Therefore, for example, if a low-speed traveling state in which the vehicle speed does not reach the predetermined speed continues for a long time, idling stop is not executed at all, resulting in restriction of idling stop more than necessary, which makes it impossible to sufficiently obtaining the effect of improvement in fuel economy by idling stop.

SUMMARY OF THE INVENTION

It is an object of the invention to provide a vehicle stop control system that is capable of ensuring the effect of improvement in fuel economy through automatic stop of the engine, by finely and properly determining traveling of a vehicle in a traffic jam and properly permitting or inhibiting automatic stop of the engine according to the result of the determination, and is capable of avoiding inconveniences caused by frequent execution of automatic stop and restart of the engine.

To attain the above object, the present invention provides a vehicle stop control system that automatically stops an internal combustion engine which is a drive source of a vehicle when predetermined stop conditions are satisfied, and automatically restarts the engine when predetermined restart conditions are satisfied, comprising vehicle speed-acquiring means for acquiring a speed of the vehicle, and precondition vehicle speed satisfaction-determining means for setting a precondition vehicle speed satisfaction flag when the vehicle speed acquired by the vehicle speed-acquiring means becomes not lower than a predetermined precondition vehicle speed after the engine was automatically stopped last time, wherein the predetermined stop conditions include a condition that the precondition vehicle speed satisfaction flag is set, the vehicle stop control system further comprising passing time period-acquiring means for acquiring a time period after the vehicle speed passed a predetermined jam determination vehicle speed and until the vehicle speed passes the predetermined jam determination vehicle speed again, as a passing time period, wherein the precondition vehicle speed satisfaction-determining means resets the precondition vehicle speed satisfaction flag when the passing time period acquired by the passing time period-acquiring means is shorter than a predetermined time period.

This vehicle stop control system executes so-called idling stop in which the engine is automatically stopped when predetermined stop conditions are satisfied, and thereafter, when predetermined restart conditions are satisfied, the engine is automatically restarted. Further, the above-mentioned predetermined stop conditions includes a condition that the precondition vehicle speed satisfaction flag is set, and the precondition vehicle speed satisfaction flag is set when the acquired vehicle speed becomes not lower than the predetermined precondition vehicle speed after the engine was automatically stopped last time. By setting this condition, unless the vehicle speed reaches the precondition vehicle speed, the precondition vehicle speed satisfaction flag is not set to thereby inhibit next automatic stop of the engine, and hence it is possible to prevent frequent execution of automatic stop of the engine during traveling in a traffic jam.

Further, a time period after the vehicle speed passed the traffic jam determination speed and until the vehicle speed passes the traffic jam determination speed again is acquired as a passing time period, and when summation of successive passing time periods is shorter than the predetermined time period, the precondition vehicle speed satisfaction flag is reset to inhibit automatic stop of the engine. When the vehicle is traveling in a traffic jam, the vehicle speed varies while remaining low, and repeatedly passes a certain speed within a low speed range. Therefore, this certain speed is defined as the traffic jam determination speed, and when a time interval at which the vehicle speed passes the traffic jam determination speed is short, it is possible to properly determine that the vehicle is traveling in a traffic jam.

From this point of view, according to the present invention, when the passing time period becomes shorter the predetermined time period, the precondition vehicle speed satisfaction flag is reset, and hence it is possible to properly inhibit automatic stop of the engine during traveling in a traffic jam. As described above, according to the present invention, it is possible to finely and properly determine traveling of the vehicle in a traffic jam, and properly permit or inhibit automatic stop of the engine according to the result of the determination. As a consequence, it is possible to ensure the effect of improvement in fuel economy by idling stop, and avoid inconveniences caused by frequent execution of idling stop and restart, e.g. troublesomeness in driving of the vehicle and discomfort, and progression of aging of components related to idling stop and restart.

Preferably, the precondition vehicle speed includes a predetermined first precondition vehicle speed and a predetermined second precondition vehicle speed which is higher than the first precondition vehicle speed, and the precondition vehicle speed is selectively set to one of the first precondition vehicle speed and the second precondition vehicle speed, and the vehicle stop control system further comprises precondition vehicle speed-changing means for setting the precondition vehicle speed to the first precondition vehicle speed when the passing time period is not shorter than the predetermined time period, and changing the precondition vehicle speed from the first precondition vehicle speed to the second precondition vehicle speed when the passing time period becomes shorter than the predetermined time period.

With the configuration of the preferred embodiment, when the passing time period is not shorter than the predetermined time period, the precondition vehicle speed is set to the first precondition vehicle speed which is the lower, and hence when the vehicle is not traveling in a traffic jam, the vehicle speed is easy to reach the precondition vehicle speed, and the precondition vehicle speed satisfaction flag is easy to be set, which makes it easier to execute automatic stop of the engine to properly increases frequency of execution of automatic stop of the engine, whereby fuel economy can be improved. Further, from this state, when the passing time period becomes shorter than the predetermined time period, the precondition vehicle speed is changed to the second precondition vehicle speed which is the higher, and hence when the vehicle is traveling in a traffic jam, the vehicle speed is difficult to reach the precondition vehicle speed, and the precondition vehicle speed satisfaction flag is difficult to be set, whereby it is possible to restrict execution of automatic stop of the engine, and further reduce frequency of execution of automatic stop of the engine.

More preferably, when the passing time period becomes not shorter than the predetermined time period in a state in which the precondition vehicle speed has been set to the second precondition vehicle speed, the precondition vehicle speed-changing means changes the precondition vehicle speed to the first precondition vehicle speed.

With the configuration of the preferred embodiment, when the passing time period becomes not shorter than the predetermined time period, it is determined that the vehicle has left a state of traveling in a traffic jam, and the precondition vehicle speed is returned to the first precondition vehicle speed. This makes it possible to properly ensure frequency of execution of automatic stop of the engine when the vehicle is not traveling in a traffic jam.

Further preferably, the precondition vehicle speed-changing means changes the precondition vehicle speed to the first precondition vehicle speed, when a state in which the vehicle speed does not pass the jam determination vehicle speed again after having passed the jam determination vehicle speed has continued for not shorter than the predetermined time period, in a state in which the precondition vehicle speed has been set to the second precondition vehicle speed.

With the configuration of the preferred embodiment, when the state in which the vehicle speed does not pass the jam determination vehicle speed again after having passed the same has continued for not shorter than the predetermined time period, it is determined that the passing time period has become not shorter than the predetermined time, and the precondition vehicle speed is changed to the first precondition vehicle speed. Therefore, it is possible to properly change the precondition vehicle speed earlier without waiting for the vehicle speed to actually pass the jam determination vehicle speed again.

More preferably, the precondition vehicle speed-changing means changes the precondition vehicle speed to the first precondition vehicle speed, when the engine is automatically stopped in a state in which the precondition vehicle speed has been set to the second precondition vehicle speed.

With the configuration of the preferred embodiment, when the engine is automatically stopped in a state in which the precondition vehicle speed has been set to the second precondition vehicle speed, it is judged that traveling of the vehicle in a traffic jam has been terminated, and the precondition vehicle speed is changed to the first precondition vehicle speed. This makes it possible to properly increase frequency of execution of automatic stop of the engine when the vehicle is not traveling in a traffic jam, and makes it possible to further improve fuel economy.

The above and other objects, features, and advantages of the present invention will become more apparent from the following detailed description taken in conjunction with the accompanying drawings.

DETAILED DESCRIPTION OF PREFERRED EMBODIMENTS

Figure 1:
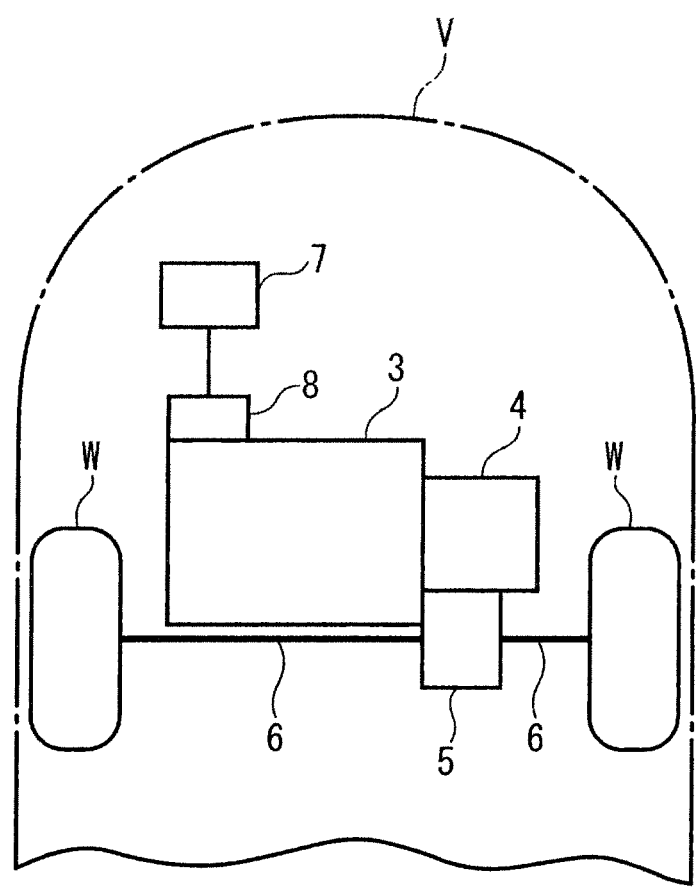
FIG. 1 is a schematic diagram of part of a vehicle to which the present invention is applied.

The invention will now be described in detail with reference to the drawings showing preferred embodiment thereof. A vehicle V shown in FIG. 1 is a front-wheel-drive four-wheeled vehicle including right and left front wheels W and W, and right and left rear wheels, not shown, (hereinafter collectively referred to as the "wheels W"), and is equipped with an internal combustion engine (hereinafter referred to as the "engine") 3, and an automatic transmission 4 that changes the speed of motive power from the engine 3.

The automatic transmission 4 includes a torque converter connected to a crankshaft (not shown) of the engine 3, a shift lever (not shown) which enables selection between the eight shift positions of "1, 2, 3, D4, D5, N, R, and P", a gear mechanism (not shown) which can switch between six kinds of gear positions, i.e. first to fifth speed positions, and a reverse position, and so forth. The motive power from the engine 3 has its speed changed by the automatic transmission 4, and then is transmitted to the right and left front wheels W and W via a final reduction mechanism 5 and right and left drive shafts 6 and 6, to thereby drive the vehicle V.

The engine 3 is subjected to so-called idling stop control in which the engine 3 is automatically stopped (idling stop) when predetermined stop conditions are satisfied, and then is automatically restarted when predetermined restart conditions are satisfied. The idling stop control is executed by an ECU 2, referred to hereinafter.

Figure 2:
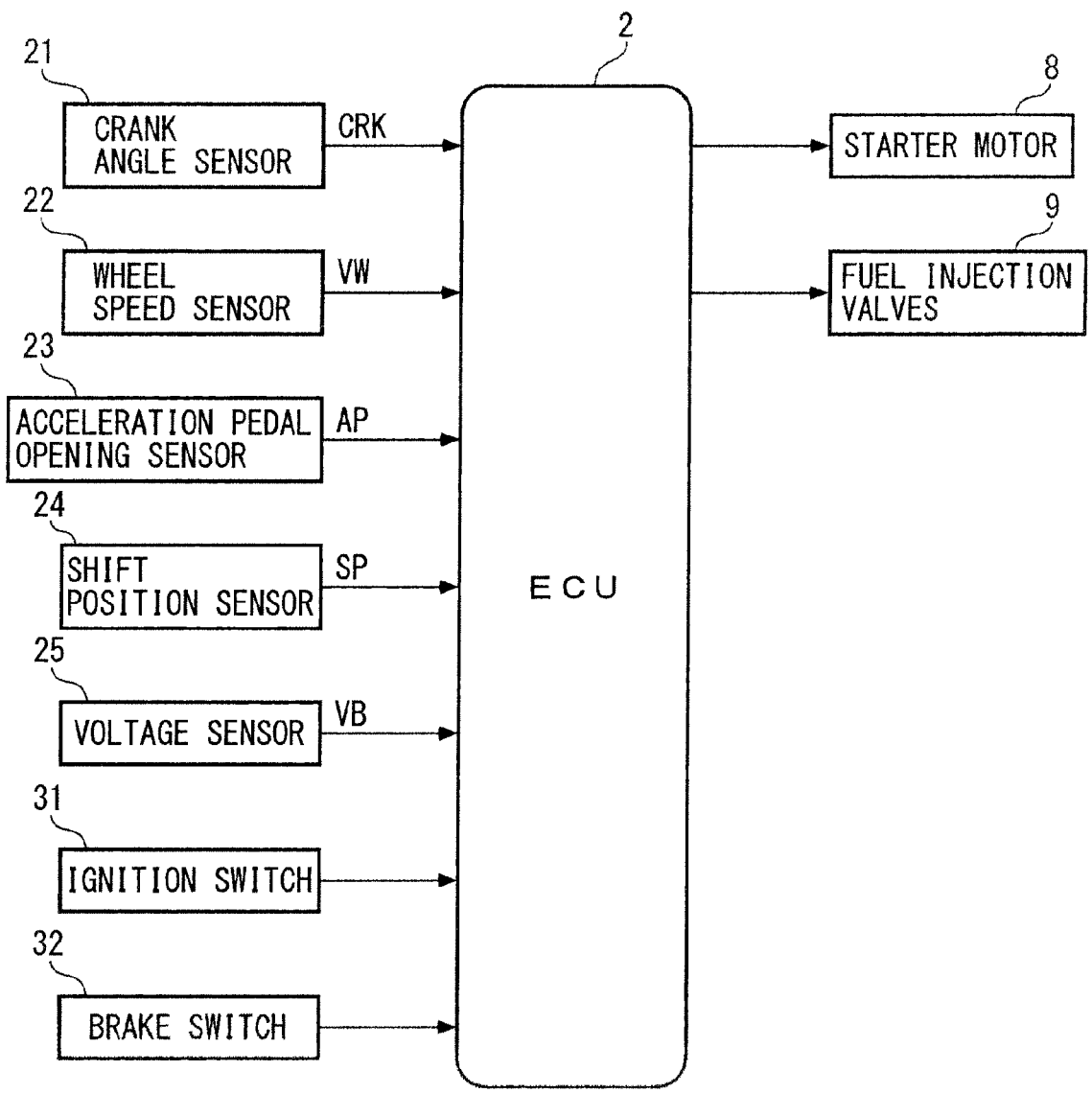
FIG. 2 is a block diagram of a vehicle stop control system.

Automatic stop of the engine 3 is executed by stopping fuel injection from fuel injection valves 9 (see FIG. 2). Further, restart of the engine 3 is executed by driving a starter motor 8 by electric power supplied from a battery 7 to cause the crankshaft to rotate (cranking) while injecting fuel from the fuel injection valves 9.

As shown in FIG. 2, a CRK signal indicative of a rotational speed of the crankshaft and a VW signal indicative of a rotational speed of each wheel W are input from a crank angle sensor 21 and a wheel speed sensor 22 to the ECU 2, respectively. The ECU 2 calculates a rotational speed NE of the engine 3 (hereinafter referred to as the "engine speed NE") based on the CRK signal, and calculates a vehicle speed VP, which is a speed of the vehicle V, based on the VW signal.

Further, a detection signal indicative of a stepped-on amount AP of an accelerator pedal, not shown, (hereinafter referred to as the "accelerator pedal opening AP") and a detection signal indicative of a shift position SP of the shift lever are input from an accelerator pedal opening sensor 23 and a shift position sensor 24 to the ECU 2, respectively.

Further, a detection signal indicative of a voltage VB of the battery 7 (hereinafter referred to as the "battery voltage VB") is input from a voltage sensor 25 to the ECU 2. The ECU 2 calculates a remaining amount of charge of the battery (hereinafter referred to as the "battery remaining charge") (SOC) based on the battery voltage VB etc.

Further, a detection signal from an ignition switch 31, indicative of an on/off state of the ignition switch 31, and a detection signal from a brake switch 32, indicative of an on/off state of a brake pedal (not shown) of the vehicle V, are input to the ECU 2, respectively.

The ECU 2 is implemented by a microcomputer comprising a CPU, a RAM, a ROM, and an input interface (none of which are specifically shown). The ECU 2 determines operating conditions of the engine 3 and the vehicle V by a control program stored in the ROM, etc., according to the detection signals from the aforementioned sensors 21 to 25 and the switches 31 and 32, and performs the idling stop control of the engine 3 based on the result of the determination.

In the present embodiment, the ECU 2 corresponds to precondition vehicle speed satisfaction-determining means, passing time period-acquiring means, and precondition vehicle speed-changing means.

Figure 3:
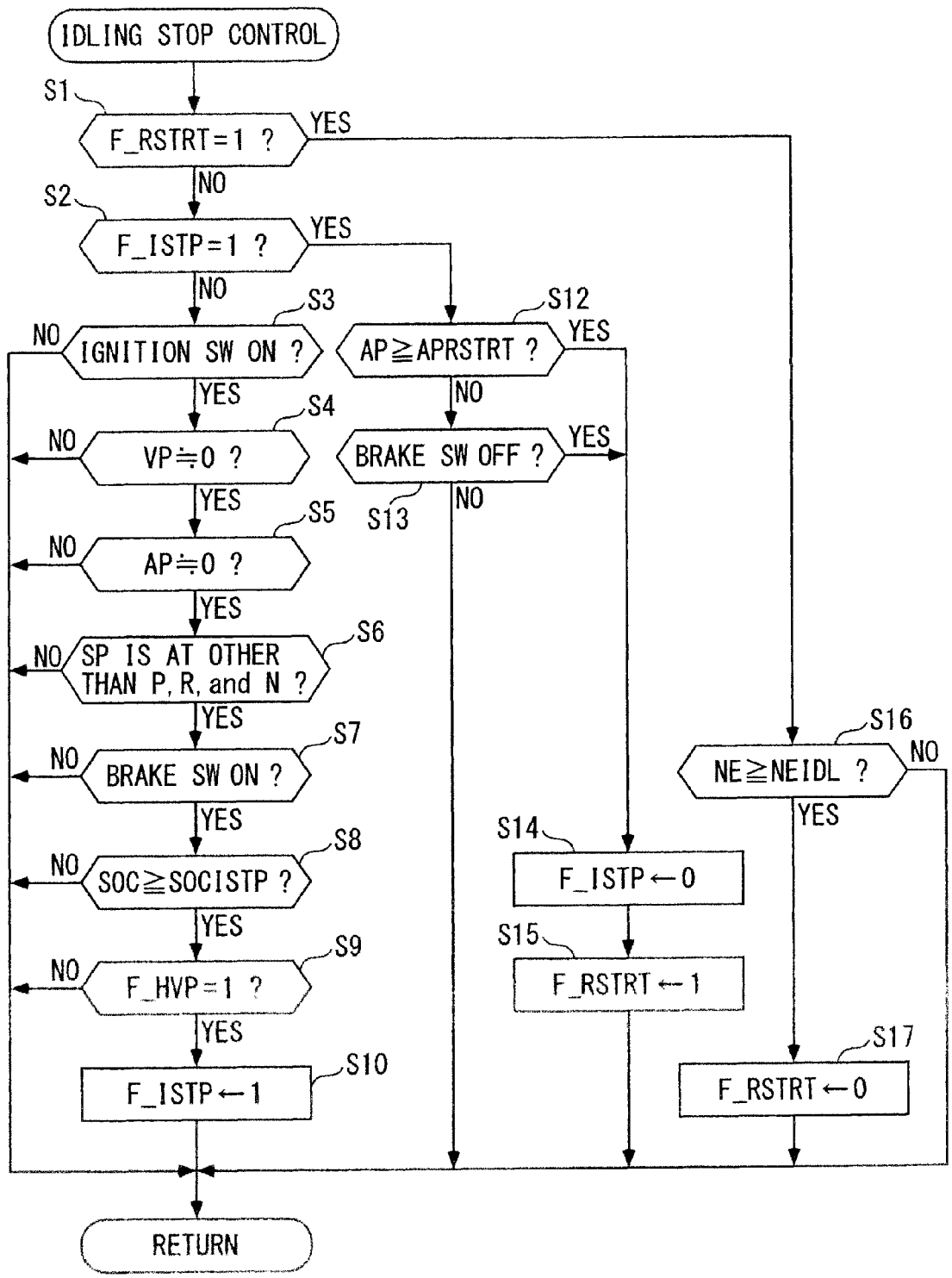
FIG. 3 is a flowchart of an idling stop control process.

Next, an idling stop control process executed by the ECU 2 will be described. FIG. 3 shows a main flow of the idling stop control process. The present process is repeatedly executed at a predetermined repetition period (e.g. one second).

In the present process, first, in a step 1 (shown as S1 in abbreviated form in FIG. 3; steps referred to hereafter are also shown in abbreviated form) and a step 2, it is determined whether or not a restart flag F_RSTRT and an idle-stop flag F_ISTP are equal to 1, respectively. If the answers to the questions of the steps 1 and 2 are both negative (NO), i.e. if the engine 3 is neither during restarting nor during idling stop, it is determined in steps 3 to 9 whether or not predetermined stop conditions for executing idling stop are satisfied.

More specifically, it is determined at the steps 3 to 9 whether or not the following conditions (a) to (g) are satisfied, respectively:

(a) the ignition switch 31 is in the on state;
(b) the vehicle speed VP is approximately equal to 0;
(c) the acceleration pedal opening AP is approximately equal to 0;
(d) the shift position SP is at a position other than P, R, and N;
(e) the brake switch 32 is in the on state;
(f) the battery remaining charge SOC is not smaller than a predetermined value SOCISTP; and
(g) a precondition vehicle speed satisfaction flag F_HVP is set to 1.

If any one of the answers to these determinations is negative (NO), it is determined that the predetermined stop conditions are not satisfied, and the present process is immediately terminated without executing idling stop. On the other hand, if the answers to these determinations are all affirmative (YES), it is determined that the predetermined stop conditions are satisfied, and the idle-stop flag F_ISTP is set to 1 (step 10), followed by terminating the present process. When the idle-stop flag F_ISTP is thus set to 1, supply of fuel to the engine 3 is stopped, and idling stop is started.

By setting the condition (b), idling stop is executed on condition that the vehicle V is at a stop. Further, the precondition vehicle speed satisfaction flag F_HVP of the condition (g) is set to 1, as described hereinafter, when the vehicle speed VP has become not lower than a predetermined precondition vehicle speed VPHREF, which is higher than an I/S-starting vehicle speed VPISTP, after termination of idling stop.

By thus setting the condition (g) based on the history of the vehicle speed VP, idling stop is inhibited even when the vehicle speed becomes equal to 0, unless the vehicle speed VP became not lower than the predetermined precondition vehicle speed VPHREF after the preceding idling stop, and hence it is possible to avoid frequent execution of idling stop and restart during a traffic jam. A method of setting the precondition vehicle speed VPHREF and the precondition vehicle speed satisfaction flag F_HVP will be described in detail hereinafter.

After idling stop has been started in accordance with execution of the step 10, the answer to the question of the step 2 becomes affirmative (YES), and in this case, it is determined in steps 12 and 13 whether or not the acceleration pedal opening AP is not smaller than a restart starting opening APRSTRT and whether or not the brake switch 32 is in the off state, respectively. If these answers to the questions of the steps 12 and 13 are both negative (NO), the present process is immediately terminated to continue idling stop.

On the other hand, if the answer to the question of the step 12 is affirmative (YES), which means that the acceleration pedal is stepped on during idling stop, or if the answer to the question of the step 13 is affirmative (YES), which means that the stepping-on operation of the brake pedal is canceled during idling stop, it is determined that conditions for restarting the engine 3 are satisfied.

In this case, the idle-stop flag F_ISTP is set to 0 (step 14) to terminate idling stop, and the restart flag F_RSTRT is set to 1 (step 15), followed by terminating the present process. When the restart flag F_RSTRT is thus set to 1, the starter motor 8 is driven to start cranking of the engine 3 so as to restart the engine 3.

After the restart of the engine 3 has thus been started, the answer to the question of the step 1 becomes affirmative (YES), and in this case, the process proceeds to a step 16, wherein it is determined whether or not the engine speed NE is not lower than a predetermined idle speed NEIDL. If the answer to the question of the step 16 is negative (NO), i.e. if NE<NEIDL holds, the present process is immediately terminated, and cranking of the engine 3 is continued.

On the other hand, if the answer to the question of the step 16 is affirmative (YES), i.e. if the engine speed NE has risen to a speed not lower than the idle speed NEIDL, it is judged that the restart of the engine 3 is completed, and the restart flag F_RSTRT is set to 0 (step 17), followed by terminating the present process.

Next, a vehicle speed history determination process for setting the above-mentioned precondition vehicle speed satisfaction flag F_HVP will be described with reference to FIG. 4. The present process is repeatedly executed at the same repetition period as that of the idling stop control process in FIG. 3.

In the present process, first, it is determined in a step 21 whether or not the idle-stop flag F_ISTP has been changed from 1 to 0 between the immediately preceding execution and the current execution of this step. If the answer to the question of the step 21 is affirmative (YES), i.e. if it is immediately after the termination of idling stop, the precondition vehicle speed satisfaction flag F_HVP is reset to 0 (step 22), followed by terminating the present process.

If the answer to the question of the step 21 is negative (NO), i.e. if it is not immediately after idling stop has been terminated, it is determined whether or not the precondition vehicle speed satisfaction flag F_HVP is equal to 1 (step 23). If the answer to the question of the step 23 is negative (NO), it is determined whether or not the vehicle speed VP is not lower than the precondition vehicle speed VPHREF (step 24). If the answer to the question of the step 24 is negative (NO), the present process is immediately terminated, whereby the precondition vehicle speed satisfaction flag F_HVP is held at 0.

On the other hand, if the answer to the question of the step 24 is affirmative (YES), i.e. if the vehicle speed VP≥the precondition vehicle speed VPHREF holds, the precondition vehicle speed satisfaction flag F_HVP is set to 1 (step 25), followed by terminating the present process. Further, after the precondition vehicle speed satisfaction flag F_HVP has thus been set to 1, the answer to the question of the step 23 becomes affirmative (YES), and in this case, the present process is immediately terminated, whereby the precondition vehicle speed satisfaction flag F_HVP is held at 1.

As is clear from the above setting method, the fact that the precondition vehicle speed satisfaction flag F_HVP is equal to 1 indicates that the vehicle speed VP has risen to the precondition vehicle speed VPHREF at least once after termination of the immediately preceding idling stop.

Next, a process for setting the above-mentioned precondition vehicle speed VPHREF will be described with reference to FIG. 5. The present process is also repeatedly executed at the same predetermined repetition period as that of the idling stop control process in FIG. 3.

In the present process, first, it is determined in a step 31 whether or not the idle-stop flag F_ISTP has been changed from 0 to 1 between the immediately preceding execution and the current execution of this step. If the answer to the question of the step 31 is affirmative (YES), i.e. if it is immediately after termination of idling stop, it is determined whether or not the precondition vehicle speed VPHREF is equal to a second precondition vehicle speed VPHREF2, referred to hereinafter (step 32). If the answer to the question of the step 32 is affirmative (YES), i.e. if the precondition vehicle speed VPHREF has been set to the second precondition vehicle speed VPHREF2, the precondition vehicle speed VPHREF is changed to a first precondition vehicle speed VPHREF1, referred to hereinafter (step 33), followed by terminating the present process. If the answer to the question of the step 32 is negative (NO), i.e. if the precondition vehicle speed VPHREF has already been set to the first precondition vehicle speed VPHREF1, the present process is immediately terminated.

If the answer to the question of the step 31 is negative (NO), i.e. if it is not immediately after idling stop has been started, it is determined whether or not the vehicle speed VP is higher than a predetermined jam determination vehicle speed VPSLOW (step 36). The jam determination vehicle speed VPSLOW is used for determining whether or not the vehicle V is traveling in a traffic jam, and is set to a predetermined value close to 0, e.g. 5 km/h. If it is determined in the step 36 that VP>VPSLOW holds, a vehicle speed determination flag F_VPJUD is set to 1 (step 37), whereas if VP≤VPSLOW holds, the vehicle speed determination flag F_VPJUD is set to 0 (step 38).

In a step 39 following the step 37 or 38, it is determined whether or not the current value of the vehicle speed determination flag F_VPJUD is equal to the immediately preceding value F_VPJUDZ. If the answer to the question of the step 39 is negative (NO), i.e. if a magnitude relationship between the vehicle speed VP and the jam determination vehicle speed VPSLOW has changed between the immediately preceding execution and the current execution of this step, it is determined that the vehicle speed VP has passed the jam determination vehicle speed VPSLOW.

In this case, an index number n of a passing time t, referred to hereinafter, is incremented (step 40). Note that the index number n is reset to 0 when the ignition key is switched on. Next, a value of a passing timer (hereinafter referred to as the "passing timer value") TM_PASS at this time is stored as the current passing time t(n) at which the vehicle speed VP has passed the jam determination vehicle speed VPSLOW (step 41). Note that the passing timer is reset to 0 when the ignition key is switched on, and is used for counting an elapsed time thereafter by the counting-up method.

Next, it is determined whether or not the index number n is not smaller than 3 (step 42). If the answer to the question of the step 42 is negative (NO), i.e. if at least three records of the passing time t have not been stored yet, the present process is immediately terminated. On the other hand, if the answer to the question of the step is affirmative (YES), a difference between the immediately preceding passing time t(n−1) and the second immediately preceding passing time t(n−2) is calculated as a first passing time period TPASS1, and a difference between the current passing time t(n) and the immediately preceding passing time t(n−1) is calculated as a second passing time period TPASS2 (step 43).

Figure 6:
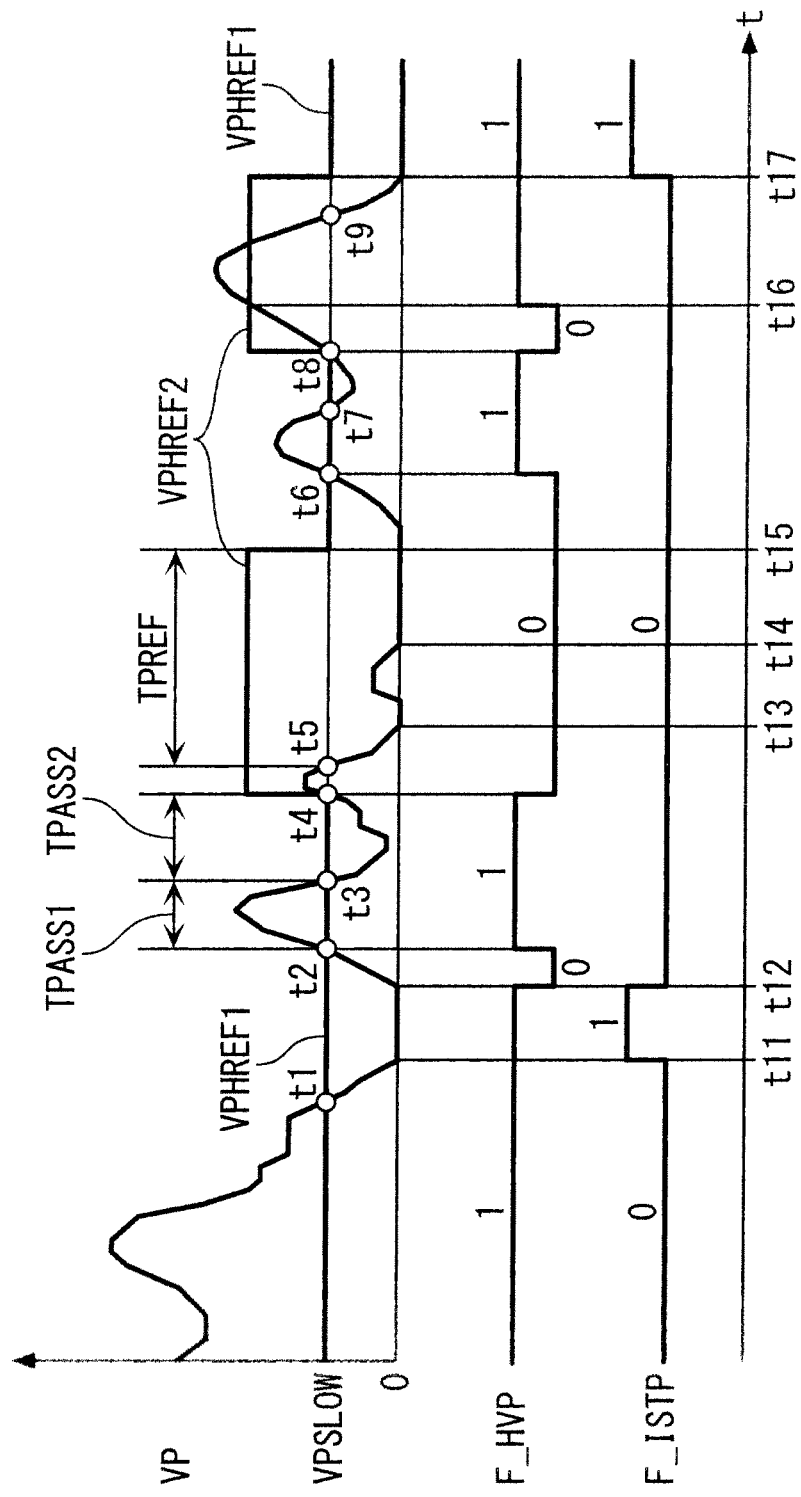
FIG. 6 is a timing diagram showing an example of operations obtained by the processes in FIGS. 3 to 5.

As is clear from the above calculation method, the first passing time period TPASS1 represents a time interval between a time at which the vehicle speed VP has passed the jam determination vehicle speed VPSLOW second last time and a time at which the vehicle speed VP passed the jam determination vehicle speed VPSLOW last time, and the second passing time period TPASS2 represents a time interval between the time at which the vehicle speed VP passed the jam determination vehicle speed VPSLOW last time and a time at which the vehicle speed VP has passed the jam determination vehicle speed VPSLOW this time (see FIG. 6).

Next, it is determined whether or not the sum of the first passing time period TPASS1 and the second passing time period TPASS2 is shorter than a predetermined time period TPREF (e.g. 20 seconds) (step 44). If the answer to the question of the step 44 is negative (NO), it is determined whether or not the second passing time period TPASS2 is shorter than the predetermined time period TPREF (step 45).

If the answer to the question of the step 45 is negative (NO), i.e. if TPASS1+TPASS2≥TPREF holds and at the same time TPASS2≥TPREF holds, this indicates that the time interval at which the vehicle speed VP passes the jam determination vehicle speed VPSLOW is long, and hence it is judged that the vehicle V is not traveling in a traffic jam, and the precondition vehicle speed VPHREF is set to the first precondition vehicle speed VPHREF1 (e.g. 5 km/h) which is equal to the jam determination vehicle speed VPSLOW (step 46), followed by terminating the present process.

As described above, as a condition for setting the precondition vehicle speed VPHREF to the first precondition vehicle speed VPHREF1, a stricter condition TPASS2≥TPREF is provided in addition to the condition TPASS1+TPASS2≥TPREF, and hence the precondition vehicle speed VPHREF is made difficult to be set to the first precondition vehicle speed VPHREF1, and easy to be set to the second precondition vehicle speed VPHREF2.

On the other hand, if the answer to the question of the step 44 is affirmative (YES), i.e. if TPASS1+TPASS2<TPREF holds, the time interval at which the vehicle speed VP passes the jam determination vehicle speed VPSLOW is short, and hence it is judged that the vehicle V is traveling in a traffic jam, and the precondition vehicle speed satisfaction flag F_HVP is reset to 0 (step 47), and the precondition vehicle speed VPHREF is set to the predetermined second precondition vehicle speed VPHREF2 (e.g. 15 km/h) higher than the first precondition vehicle speed VPHREF1 (step 48), followed by terminating the present process. Further, if the answer to the question of the step 45 is affirmative (YES), the present process is immediately terminated, whereby the precondition vehicle speed VPHREF is held at the currently set value.

Further, if the answer to the question of the step 39 is affirmative (YES), i.e. if the vehicle speed VP has not passed the jam determination vehicle speed VPSLOW, it is determined whether or not the precondition vehicle speed VPHREF is equal to the second precondition vehicle speed VPHREF2 (step 49). If the answer to this question is negative (NO), the present process is immediately terminated.

On the other hand, if the answer to the question of the step 49 is affirmative (YES), i.e. if the precondition vehicle speed VPHREF has been set to the second precondition vehicle speed VPHREF2, it is determined whether or not a difference between the passing timer value TM_PASS at the time and the latest passing time t(n), i.e. a time period elapsed after the vehicle speed VP passed the jam determination vehicle speed VPSLOW last time, is not shorter than the predetermined time period TPREF (step 50). If the answer to this question is negative (NO), the present process is immediately terminated.

On the other hand, if the answer to the question of the step 50 is affirmative (YES), i.e. if a state in which the vehicle speed VP does not pass the jam determination vehicle speed VPSLOW again after having passed the same has continued for not shorter than the predetermined time period TPREF, the process proceeds to the step 46, wherein the precondition vehicle speed VPHREF is changed to the first precondition vehicle speed VPHREF1, followed by terminating the present process.

FIG. 6 shows an example of operations obtained by the idling stop control according to the present embodiment, described as above. In FIG. 6, each point at which the vehicle speed VP has passed the jam determination vehicle speed VPSLOW is indicated by a white circle, and passing times each indicated by the while circle are sequentially denoted as t1 to t9, respectively. Further, in the present embodiment, since the jam determination vehicle speed VPSLOW is equal to the first precondition vehicle speed VPHREF1, when the precondition vehicle speed VPHREF is set to the first precondition vehicle speed VPHREF1, the point at which the vehicle speed VP reaches the precondition vehicle speed VPHREF and the point at which the vehicle speed VP passes the jam determination vehicle speed VPSLOW coincide with each other. Note that in this example, it is assumed that out of the above-mentioned conditions (a) to (g) for executing idling stop, the conditions except (b) and (g) concerning the vehicle speed VP are all satisfied.

Figure 4:
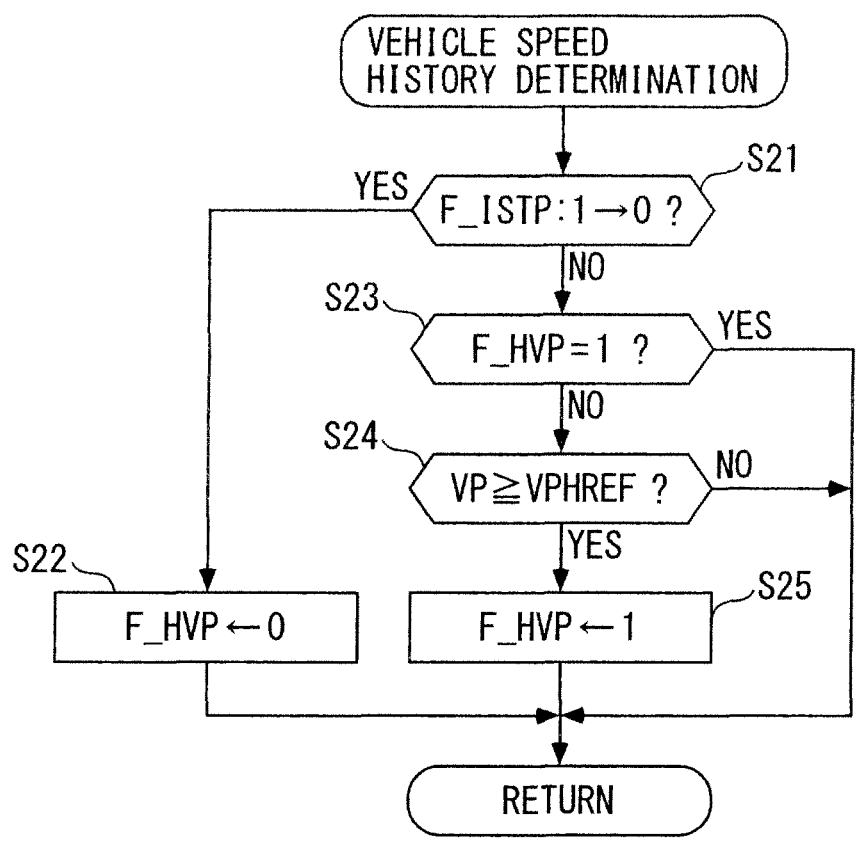
FIG. 4 is a flowchart of a vehicle speed history determination process.

In this example, before a time point t11, the precondition vehicle speed VPHREF is set to the first precondition vehicle speed VPHREF1, and further, the precondition vehicle speed satisfaction flag F_HVP is set to 1 because the vehicle speed VP has once exceeded the precondition vehicle speed VPHREF (step 25 in FIG. 4). Therefore, from this state, when the vehicle speed VP becomes equal to 0 (t11), the idle-stop flag F_ISTP is set to 1, and idling stop is executed.

After that, the precondition vehicle speed satisfaction flag F_HVP is reset to 0 when idling stop is terminated (t12) (step 22 in FIG. 4), and further is set to 1 when the vehicle speed VP reaches the precondition vehicle speed VPHREF (t2).

Then, the vehicle speed VP passes the jam determination vehicle speed VPSLOW at a short time interval (t3, t4), and hence at the passing time t4, the sum of the first passing time period TPASS1 (=t3−t2) and the second passing time period TPASS2 (=t4−t3) becomes shorter than the predetermined time period TPREF. In accordance with this, the precondition vehicle speed satisfaction flag F_HVP is reset to 0, and the precondition vehicle speed VPHREF is changed to the second precondition vehicle speed VPHREF2 which is the higher (steps 44, 47, and 48 in FIG. 5).

For some time after that, the vehicle speed VP does not reach the precondition vehicle speed VPHREF, and hence the precondition vehicle speed satisfaction flag F_HVP is held at 0, and idling stop is inhibited. Therefore, even when the vehicle speed VP becomes equal to 0 (t13, t14), idling stop is not executed.

Figure 5:
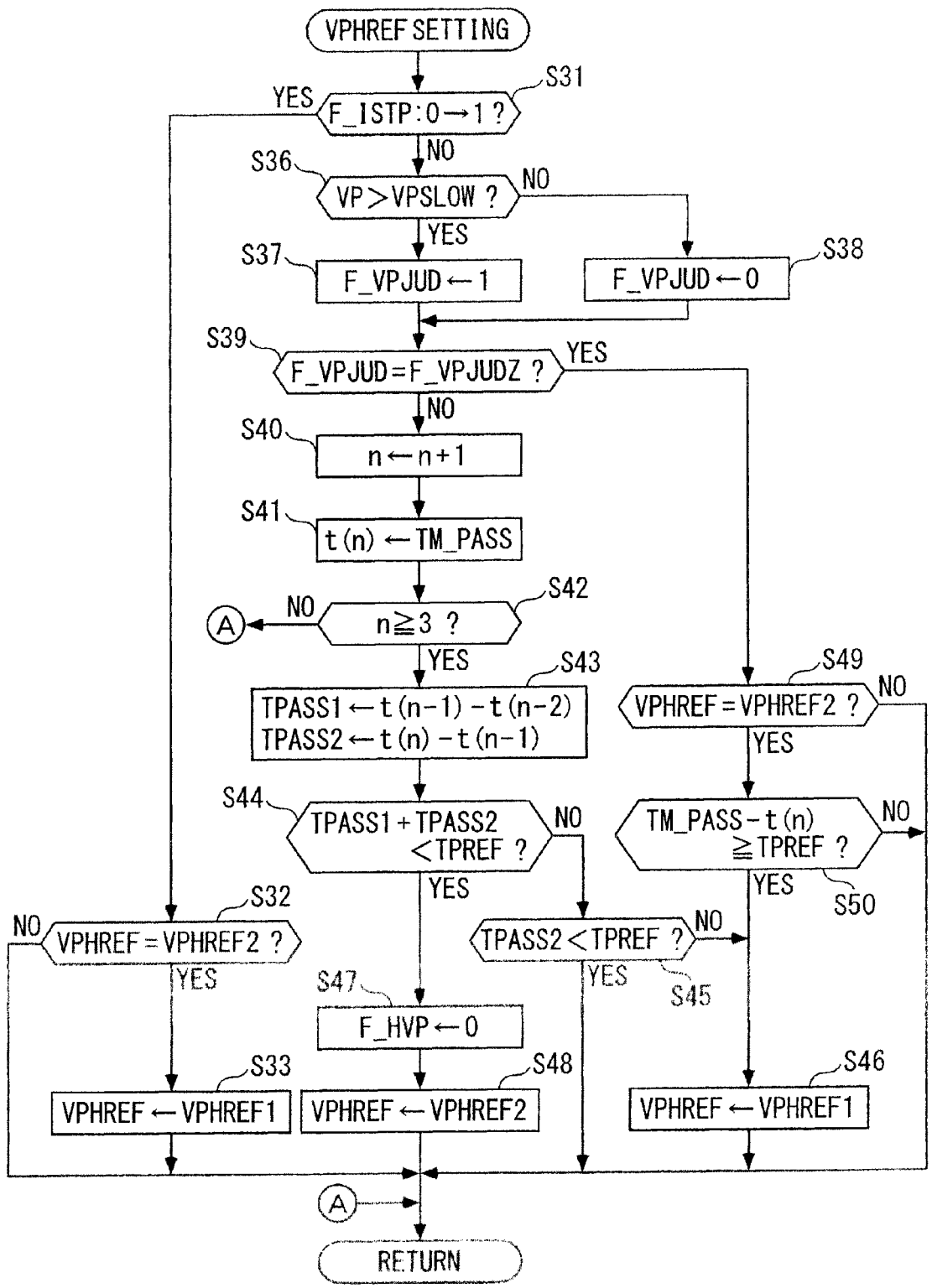
FIG. 5 is a flowchart of a precondition vehicle speed-setting process.

Further, after the passing time t5 immediately after the passing time t4, a state in which the vehicle speed VP does not pass the jam determination vehicle speed VPSLOW continues, and when the time reaches the predetermined time period TPREF (t15), the precondition vehicle speed VPHREF is changed to the first precondition vehicle speed VPHREF1 (steps 49, 50, and 46 in FIG. 5).

After that, when the sum of the first passing time period TPASS1 and the second passing time period TPASS2 becomes shorter than the predetermined time period TPREF during a period of time between t6 and t8, the precondition vehicle speed satisfaction flag F_HVP is reset to 0 again, and the precondition vehicle speed VPHREF is changed to the second precondition vehicle speed VPHREF2. Then, when the vehicle speed VP has reached the precondition vehicle speed VPHREF (t16), the precondition vehicle speed satisfaction flag F_HVP is reset to 1. Therefore, when the vehicle speed VP becomes equal to 0 (t17), idling stop is executed, and in accordance with this, the precondition vehicle speed VPHREF is returned to the first precondition vehicle speed VPHREF1 (steps 31 to 33 in FIG. 5).

As described above, according to the present embodiment, the time intervals between the three passing time points t(n−2) to t(n) at which the vehicle speed VP has passed the jam determination vehicle speed VPSLOW are calculated as the first passing time period TPASS1 and the second passing time period TPASS2, and when the sum of the first and second passing time periods TPASS1 and TPASS2 becomes shorter than the predetermined time period TPREF, it is judged that the vehicle V is traveling in a traffic jam, and the precondition vehicle speed satisfaction flag F_HVP is reset to 0 to thereby inhibit idling stop during traveling in a traffic jam.

This makes it possible to finely and properly determine traveling of the vehicle V in a traffic jam, and properly permit or inhibit idling stop according to the result of the determination. As a consequence, it is possible to ensure the effect of improvement in fuel economy by idling stop, and prevent the operations of idling stop and restart from being repeatedly and frequently executed, whereby it is possible to avoid inconveniences caused by frequent execution of idling stop and restart. For example, it is possible to prevent troublesomeness in driving of the vehicle V and discomfort from being caused by frequent execution of idling stop and restart, and further it is possible to suppress aging of components related to idling stop and restart, particularly, the starter motor 8, to thereby increase service life of the same.

Further, when the sum of the first and second passing time periods TPASS1 and TPASS2, and the second passing time period TPASS2 are both not shorter than the predetermined time period TPREF, the precondition vehicle speed VPHREF is set to the first precondition vehicle speed VPHREF1 which is the lower. Therefore, when the vehicle V is not traveling in a traffic jam, the vehicle speed is easy to reach the precondition vehicle speed, and the precondition vehicle speed satisfaction flag is made easy to be set, whereby idling stop is made easy to be executed, causing an increase in the frequency of execution of idling stop, which can further improve fuel economy.

Further, when the sum of the first and second passing time periods TPASS1 and TPASS2 becomes shorter than the predetermined time period TPREF in this state, the precondition vehicle speed VPHREF is changed to the second precondition vehicle speed VPHREF2 which is the higher, and hence the vehicle speed is made difficult to reach the precondition vehicle speed, and the precondition vehicle speed satisfaction flag is made difficult to be set, whereby it is possible to restrict execution of automatic stop, and further reduce frequency of execution of automatic stop.

Further, as described above, as the condition for setting the precondition vehicle speed VPHREF to the first precondition vehicle speed VPHREF1, the stricter condition that not only the sum of the first and second passing time periods TPASS1 and TPASS2 but also the second passing time period TPASS2 is not shorter than the predetermined time period TPREF is provided. By setting this condition, the precondition vehicle speed VPHREF is made difficult to be set to the first precondition vehicle speed VPHREF1, but is made easy to be set to the second precondition vehicle speed VPHREF2, and hence when the traveling condition of the vehicle V is in the vicinity of a boundary between traveling in a traffic jam and traveling not in a traffic jam, it is possible to control the execution of automatic stop such that it is less frequent.

Further, when the second passing time period TPASS2 becomes not shorter than the predetermined time period TPREF in a state in which the precondition vehicle speed VPHREF has been set to the second precondition vehicle speed VPHREF2, the precondition vehicle speed VPHREF is returned to the first precondition vehicle speed VPHREF1. This makes it possible to properly ensure frequency of execution of idling stop when the vehicle V is not traveling in a traffic jam.

In this case, when the state where the vehicle speed VP does not pass the jam determination vehicle speed VPSLOW again after having passed the same has continued for not shorter than the predetermined time period TPREF, the precondition vehicle speed VPHREF is changed to the first precondition vehicle speed VPHREF1, and hence it is possible to properly change the precondition vehicle speed VPHREF earlier without waiting for the vehicle speed VP to actually pass the jam determination vehicle speed VPSLOW again.

Further, when idling stop is executed in a state in which the precondition vehicle speed VPHREF has been set to the second precondition vehicle speed VPHREF2, it is judged that the traveling in a traffic jam has been terminated, whereby the precondition vehicle speed VPHREF is returned to the first precondition vehicle speed VPHREF1, and hence it is possible to properly increase frequency of execution of idling stop when the vehicle V is not traveling in a traffic jam to thereby further improve fuel economy.

Note that the present invention is not limited to the above-described embodiment, but can be practiced in various forms. For example, although in the embodiment, as the passing time period of the vehicle speed VP, the sum of the first and second passing time periods TPASS1 and TPASS2 and the second passing time period TPASS2 are used in combination, one of the two may be used.

Further, although in the embodiment, before returning the precondition vehicle speed VPHREF from the second precondition vehicle speed VPGREF2 to the first precondition vehicle speed VPHREF1, it is determined that the second passing time period TPASS2 is not shorter than the predetermined time period TPREF, when the predetermined time period TPREF has elapsed in a state in which the vehicle speed VP does not pass the jam determination vehicle speed VPSLOW again after having passed the same, this determination may be performed by waiting for the vehicle speed VP to actually pass the jam determination vehicle speed VPSLOW again and comparing the second passing time period TPASS2 calculated based on the actual passing time with the predetermined time period TPREF.

Further, although in the embodiment, the precondition vehicle speed VPHREF is formed by the first and second precondition vehicle speeds VPHREF1 and VPHREF2, the precondition vehicle speed VPHREF may be formed by a single one. Further, although in the embodiment, idling stop is executed under the condition that the vehicle V is at a stop, this is not limitative, but the present invention can be applied to a case where idling stop is executed during traveling without waiting for the vehicle V to stop.

Further, the values of the predetermined time period TPREF, the first and second precondition vehicle speeds VPHREF1 and VPHREF2, and the jam determination vehicle speed VPSLOW are provided only by way of example, and can be changed according to a situation.

It is further understood by those skilled in the art that the foregoing is a preferred embodiment of the invention, and that various changes and modifications may be made without departing from the spirit and scope thereof.

What is claimed is:

1. A vehicle stop control system that automatically stops an internal combustion engine which is a drive source of a vehicle when predetermined stop conditions are satisfied, and automatically restarts the engine when predetermined restart conditions are satisfied, comprising:
   vehicle speed-acquiring means for acquiring a speed of the vehicle; and
   precondition vehicle speed satisfaction-determining means for setting a precondition vehicle speed satisfaction flag when the vehicle speed acquired by said vehicle speed-acquiring means becomes not lower than a predetermined precondition vehicle speed after the engine was automatically stopped last time,
   wherein the predetermined stop conditions include a condition that the precondition vehicle speed satisfaction flag is set,
   the vehicle stop control system further comprising passing time period-acquiring means for acquiring a time period after the vehicle speed passed a predetermined jam determination vehicle speed and until the vehicle speed passes the predetermined jam determination vehicle speed again, as a passing time period,
   wherein said precondition vehicle speed satisfaction-determining means resets the precondition vehicle speed satisfaction flag when the passing time period acquired by said passing time period-acquiring means is shorter than a predetermined time period.

2. The vehicle stop control system according to claim 1, wherein the precondition vehicle speed includes a predetermined first precondition vehicle speed and a predetermined second precondition vehicle speed which is higher than the first precondition vehicle speed, and the precondition vehicle speed is selectively set to one of the first precondition vehicle speed and the second precondition vehicle speed, and
   the vehicle stop control system further comprising precondition vehicle speed-changing means for setting the precondition vehicle speed to the first precondition vehicle speed when the passing time period is not shorter than the predetermined time period, and changing the precondition vehicle speed from the first precondition vehicle speed to the second precondition vehicle speed when the passing time period becomes shorter than the predetermined time period.

3. The vehicle stop control system according to claim 2, wherein when the passing time period becomes not shorter than the predetermined time period in a state in which the precondition vehicle speed has been set to the second precondition vehicle speed, said precondition vehicle speed-changing means changes the precondition vehicle speed to the first precondition vehicle speed.

4. The vehicle stop control system according to claim 3, wherein said precondition vehicle speed-changing means changes the precondition vehicle speed to the first precondition vehicle speed, when a state in which the vehicle speed does not pass the jam determination vehicle speed again after having passed the jam determination vehicle speed has continued for not shorter than the predetermined time period, in a state in which the precondition vehicle speed has been set to the second precondition vehicle speed.

5. The vehicle stop control system according to claim 2, wherein said precondition vehicle speed-changing means changes the precondition vehicle speed to the first precondition vehicle speed, when the engine is automatically stopped in a state in which the precondition vehicle speed has been set to the second precondition vehicle speed.

6. The vehicle stop control system according to claim 3, wherein said precondition vehicle speed-changing means changes the precondition vehicle speed to the first precondition vehicle speed, when the engine is automatically stopped in a state in which the precondition vehicle speed has been set to the second precondition vehicle speed.

7. The vehicle stop control system according to claim 4, wherein said precondition vehicle speed-changing means changes the precondition vehicle speed to the first precondition vehicle speed, when the engine is automatically stopped in a state in which the precondition vehicle speed has been set to the second precondition vehicle speed.

* * * * *